United States Patent [19]

Hartsfield

[11] Patent Number: 4,877,408

[45] Date of Patent: Oct. 31, 1989

[54] COMPETITIVE COMPUTER EDUCATIONAL GAME

[76] Inventor: Ben W. Hartsfield, Rte. 3, Morrison, Tenn. 37357

[21] Appl. No.: 153,954

[22] Filed: Feb. 9, 1988

[51] Int. Cl.$^4$ ................................................. G09B 5/00
[52] U.S. Cl. ................................... 434/350; 434/352; 434/336; 434/323; 434/307
[58] Field of Search ............... 434/350, 351, 352, 336, 434/335, 307, 323, 327

[56] References Cited

U.S. PATENT DOCUMENTS

| | | | |
|---|---|---|---|
| 4,593,904 | 6/1986 | Graves | 434/336 |
| 4,609,358 | 9/1986 | Sangster | 434/350 |
| 4,715,818 | 12/1987 | Shapiro et al. | 434/350 |
| 4,759,717 | 7/1988 | Larochelle et al. | 434/350 |
| 4,767,335 | 8/1988 | Curt | 434/350 |

Primary Examiner—Leo P. Picard
Assistant Examiner—Jessica J. Harrison

[57] ABSTRACT

The present invention provides a method of teaching rote facts by the use of a computer network and the required software with the following functions:

(1) Student interest is maintained by engaging the students in a competative game. Each student has access to a computer terminal with which to input the correct answer to a question posed by a master computer. The master computer keeps score and handicaps the faster players so that the slower players always have a chance to win occasionally and therefore their interest is maintained.

(2) To further promote learning the correct answer is displayed after the first student inputs an answer to the question.

(3) The handicap of each student is recorded and is accessable only to the teacher for evaluating the students.

(4) Scores are automatically recorded for future evaluation by the teacher.

10 Claims, 2 Drawing Sheets

COMPETITIVE COMPUTER EDUCATIONAL GAME

BACKGROUND OF THE INVENTION

Numerous educational computer programs have been written over the years with varing degrees of usefulness. The chief drawback of previous programs is that unless the student posseses an inquisitive mind he or she soon becomes bored with answering the questions the computer asks and the learning process stops. What is needed is a system where group participation can be employed and the peer preesure will keep all students interested in the learning process. Even though the students using the computer game can be pre grouped according to ability a handicaping system must be employed to keep the slower students from always losing and thereby becoming discouraged.

SUMMARY OF THE INVENTION

The present invention provides a method of teaching rote facts by the use of a computer program desgned to maintain student interest at a high level by the use of a competative game. A master computer asks questions and keeps the score of students entering answers on computer terminals. A handicap system tends to keep all scores equal. The handicap is recorded for each student and is available to the teacher for use in evaluating the students.

Various other features of the method and apparatus of the present invention will become obvious to those skilled in the art upon reading the disclosure set forth hereinafter.

BRIEF DESCRIPTION OF THE DRAWINGS

Referring now to the drawings which only show one example of the hardware and software in accordance with the present invention used in the discription of the method in accordance with the present invention.

DETAILED DESCRIPTION OF THE INVENTION

Figure 1:
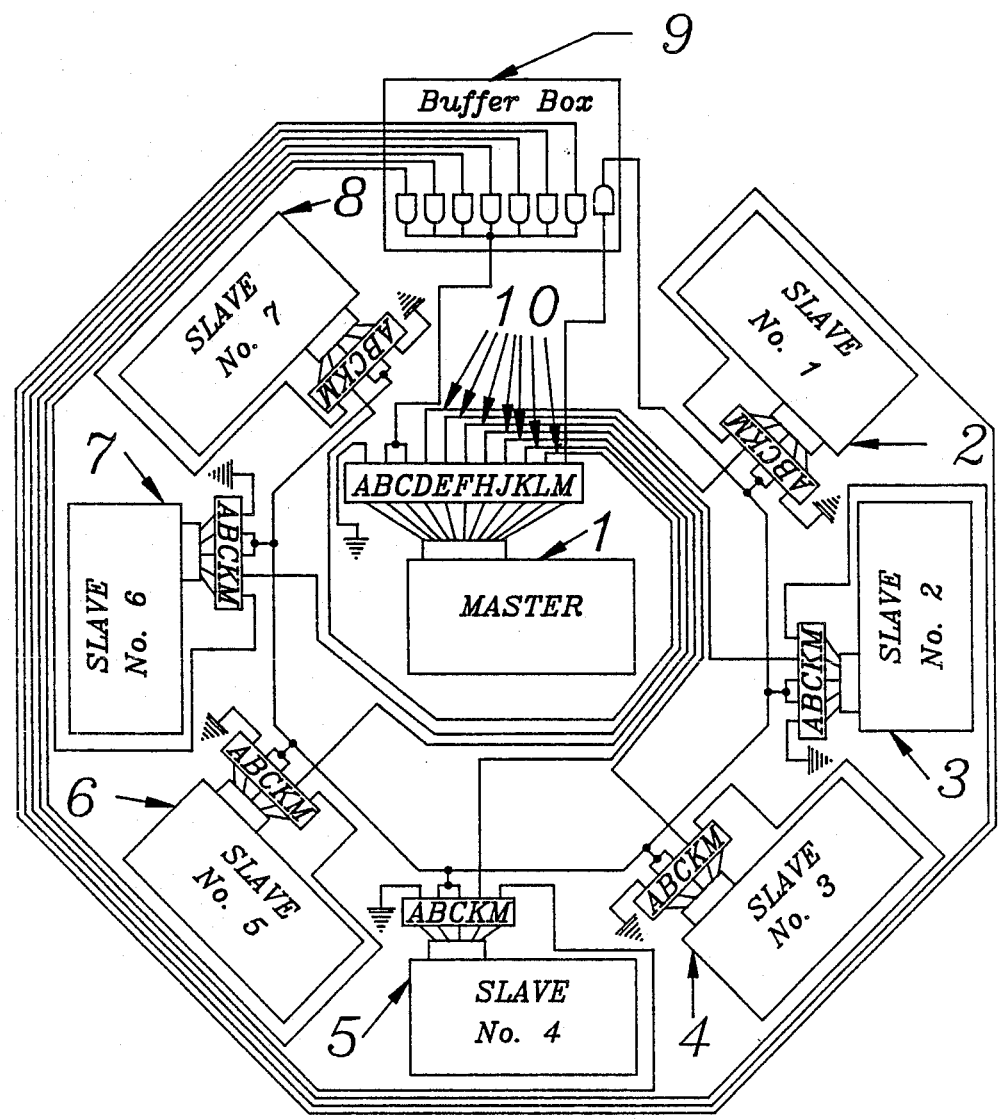
FIG. 1. Schematic Diagram Of Hardware Required To Practice This Invention.

Referring to FIG. 1, For purposes of illustration seven slave Commodore 64 computers (2 thru 8) are shown hooked into a network with an eighth master Commodore 64 computer (1) through their respective "user ports". The output of the master computer (pin M of the user port) is connected throught a common buffer (9) to the input (pins B and C of the user port) of each slave computer such that when the master computer sends a bit each slave receives that bit at the same time. The output of each slave (pin M of the user port) is buffered by it's own buffer located in the buffer box (9) and sent to the input (pin B and C of the user port) of the master computer. To assure that only one slave at a time will try to send to the common master input, a control line (10) is run from the master computer (pins D through L of the user port) to each slave (pin K) respectively. Master computer user port pins D through L are output ports that are software controled to allow one slave at a time to send. All computers share a common ground through pin A of their user ports. The buffers are contained in a common (9) box and are composed of #75451 chips.

Figure 2:
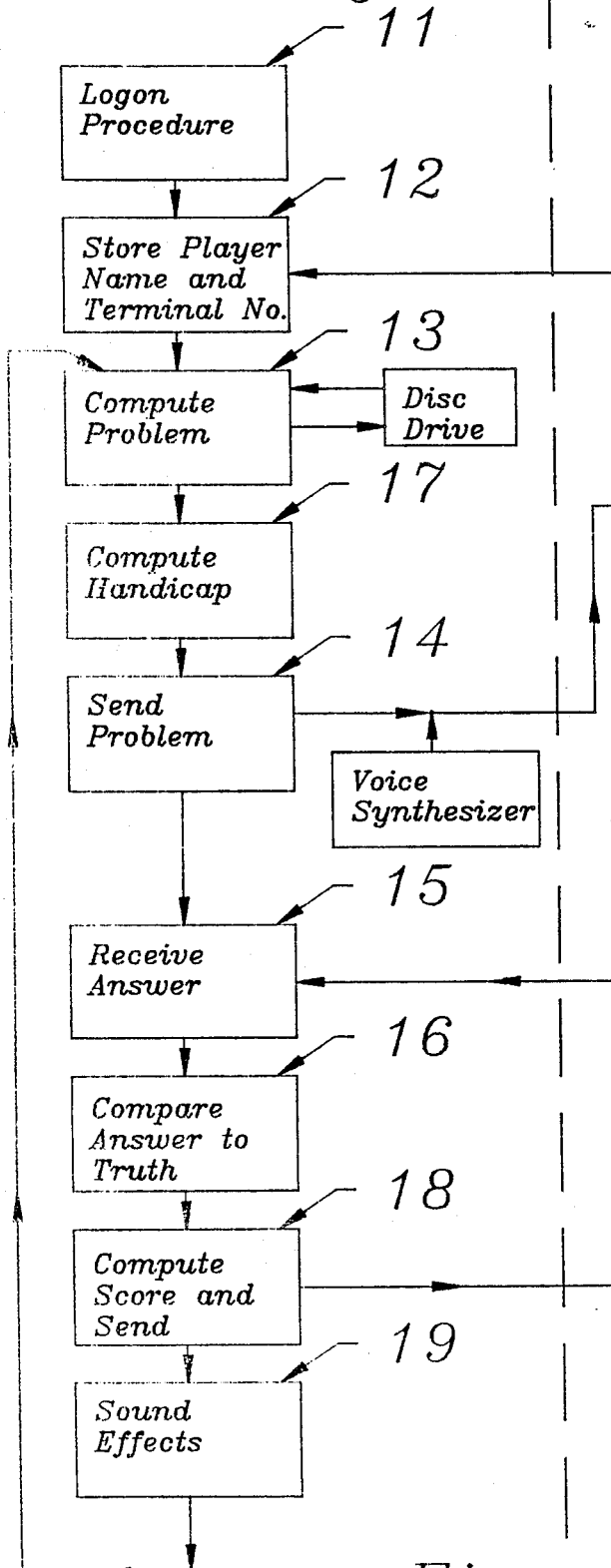
FIG. 2. Flow Chart Of Computer Program Required To Practice This Invention.

Refering to FIG. 2, A flow chart for the master computer program is shown to the left of the dotted line. A flow chart for each of the slave computer programs is shown to the right of the dotted line. Arrowed lines crossing the dotted line towards the right represent data sent from the master computer to all of the slave computers at once. Arrowed lines crossing the dotted line towards the left represent data being sent from each slave computer in turn to the master computer.

Considering the master computer flow chart to the left of the dotted line. The first thing that happens is a student logs on by entering a name (11). A routine then activates the clear to send line to one slave terminal at a time allowing the students to send their students name, and terminal number to the master computer where they are stored (12). When all of the students are logged on a "space bar" is then entered on the master computer terminal setting the game in motion.

The master computer computes a problem (13) in this case or reads a question from the floppy disc and sends (14) it to each of the slave terminals where it is displayed. The master computer then brings high the control line to each of the slave terminals in turn in the inverse order of their scores allowing them to send an answer if one has been entered. When all of the slaves have been given a turn to answer (15), the master then evaluates the answers in the inverse order of their score. When an answer is found it is compared (16) with the right answer and if correct, points are added to that players score (18) to bring his score up 75% of the way to the highest players score, a praise message is printed, and a happy tune is played (19), the problem and the correct answer are printed, and a happy code is sent to all slave ternminals. If the answer is incorrect an unplesant sound is uttered, the problem and the correct answer is printed and an unhappy code is sent to all slave terminals. A new handicap is then generated (17) for each player as follows: The higher the players score the sooner the student's turn to send an answer will occur in the answering cycle giving that sudent a time disadvantage. A new problem is generated and the cycle is repeated until someone gets a score of 25 or greater.

Considering the slave terminal program flow chart to the right of the dotted line. The terminal is initially in a watching loop (20) waiting to be instructed by the master to allow it's student to logon. When so instructed by the master, players at the slave terminals are asked to logon. (21) When a student at a terminal logs on the program then interogates it's control line until it gets a signal from the master to send it's logon information to the master computer. The slave program then waits for a problem to be sent (22). When a problem is received it is printed and the program then watches for an entry of an answer by the student. When an answer is entered the program then interogates it's terminal control line until permission is recieved to send (23) the answer to the master terminal. Upon sending an answer to the master the slave program then waits for a code to print a happy or sad message and utter a happy or sad sound (24). The slave terminal program also waits for the updated score and a code to print the updated scoreboard (25). The program then waits for the problem and the correct answer which are printed. The program then waits for a new problem which it prints. Upon printing a new problem the slave terminal then waits for the student to enter an answer and the cycle is repeated.

Details of the operation of the master and slave programs may be found in the attached "BASIC" listings.

```
100 REM MAS150
110 OPEN2,2,2,CHR$(6)
120 OPEN4,8,4,"@0:GAME#,S,R"
130 INPUT#4,G
140 CLOSE4
150 A$="AAAAA"
160 PRINT#2,A$
170 FOR I=1 TO 20
180 GET#2,A$:GETB$:NEXT I
190 DIM U$(10)
200 DIM A(8)
210 DIM Z$(8)
220 DIM S(8,3),B(8,2)
230 FOR T=1 TO 7:X(T)=(255-2↑T):NEXT T
240 N$="8"
250 FOR T=1 TO 8:U$(T)="":S(T,1)=0:NEXT T
260 PRINT CHR$(147)
270 INPUT"DO YOU WANT TO SEE SCORES";A$
280 IF A$="Y" THEN GOTO 2440
290 P=G+1
292 PRINT "GAME#=";P
300 INPUT"ENTER YOUR NAME";U$
310 PRINT#2,A$
320 T=VAL(N$)
330 U$(T)=U$
340 U$=""
350 PRINT#2,CHR$(63)
360 PRINT#2,CHR$(63)
370 PRINT CHR$(147)
380 PRINT "WHEN EVERYONE IS READY HIT A SPACE BAR"
390 FOR T= 1 TO 20 :GET#2,A$ :NEXT T
400 U$=""
410 FOR W=1 TO 7
420 POKE 56577,1
430 T=W
440 POKE 56579,X(T)
450 FOR I=1 TO 30
460 GET#2,A$
470 IF A$=CHR$(13) THEN GOTO 610
480 IF A$ <>""THEN U$=U$+A$
490 NEXT I
500 IF U$ <>""THEN GOTO 610
510 GET A$
520 IF A$=CHR$(32) THEN GOTO 660
530 IF A$ <>""THEN U$=U$+A$
540 NEXT W
550 FOR I=1 TO 20
560 GET A$
570 IF A$=CHR$(32) THEN GOTO 660
580 IF A$ <>""THEN U$=U$+A$
590 NEXT I
600 GOTO 400
610 T$=LEFT$(U$,1)
620 T=VAL(T$)
630 U$(T)=MID$(U$,2)
640 PRINT U$(T)
650 GOTO 400
660 REM ITEM 660 THROUGH 710 SENDS SLAVES A LIST OF PLAYERS
670 PRINT#2,CHR$(32)
680 FOR T=1 TO 8
690 IF U$(T)=""THEN U$(T)=CHR$(48)
700 PRINT#2, U$(T)
710 NEXT T
720 PRINT CHR$(147)
730 PRINT"NAME           SCORE"
740 FOR T=1 TO 8
750 PRINTU$(T);TAB(16);S(T,1)
760 NEXT T
770 N=1
780 REM ITEM 780 THRU 930 GENERATES PROBLEMS AND ANSWERS
790 FOR I=1TO10:X=RND(1):NEXT I
800 FOR I=1 TO 10 : GET#2,A$:GETB$:NEXTI
810 PRINT#2,CHR$(13)
820 X=RND(1)
830 IF X< .3333 THEN Y=43
840 IF X> .3333 AND X<=.6666 THEN Y= 45
850 IF X > .6666 THEN Y=42
860 D=INT(RND(1)*10)+1
870 E=INT(RND(1)*10)+1
```

```
880  IF Y=43 THEN Q=D+E
890  IF Y=45 THEN Q=D-E
900  IF Y=42 THEN Q=D*E
910  IF Y=42 THEN Y=88
920  IF Q<0 THEN GOTO 820
930  Q$=STR$(Q)
940  GOSUB 1730
950  REM ITEM 960 SENDS PROBLEM TO SLAVES
960  PRINT#2,D;CHR$(Y);E;"=";CHR$(13)
970  IF T$="8"THEN 1000
980  FOR X=1 TO 1200
990  NEXT
1000 PRINT D;CHR$(Y);E;"="
1010 REM ITEM 1010 THRU 1310 GETS ANAWERFROM SLAVES
1020 POKE 56577,1
1030 Z$="": R$=""
1040 FOR T=1 TO 8:Z$(T)="":NEXT T
1050 U=8
1060 FOR T=1 TO 8:Z$(T)="":NEXT T
1070 FOR T=U TO 1 STEP-1
1080 F= B(T,2)
1090 IF F=8 THEN 1200
1100 POKE 56579,X(F)
1110 FOR I=1 TO 10
1120 GET#2,A$
1130 IF A$=CHR$(99) THEN 1170
1140 IF A$=CHR$(13) THEN 1170
1150 IF A$="" THEN 1170
1160 Z$(T)=Z$(T)+ A$
1170 NEXT I
1180 NEXT T
1190 GOTO 1330
1200 U=T-1
1210 POKE 56579,255
1220 IF U=0 THEN U=8
1230 FOR I=1TO 5
1240 GET B$
1250 IF B$<>CHR$(13) THEN GOTO 1270
1260 T=8: Z$(T)="8"+R$
1270 IF B$<>"" THEN R$=R$+B$
1280 IF B$<>"" THEN PRINT B$;
1290 IF B$=CHR$(137) THEN PRINT #2,CHR$(137)
1300 IF B$=CHR$(137) THEN GOTO 2260
1310 NEXT I : IF T=1 THEN 1330
1320 GOTO 1070
1325 REM ITEM 1330 THRU 1500 COMPARES SLAVE ANSWER TO TRUTH
1330 POKE56579,255 :FOR T=1 TO 8
1340 F=B(T,2):Z$=Z$(F)
1350 IF Z$<>""THEN 1380
1360 NEXT T
1370 GOTO 1050
1380 REM ITEM 1380 THRU 1540 COMPARES SLAVE ANSWER TO TRUTH
1390 PRINT CHR$(147)
1400 PRINT#2,CHR$(147)
1410 FORI=1 TO 2000:NEXT I
1420 T$=LEFT$(Z$,1)
1430 Z$=MID$(Z$,2)
1440 X=VAL(Z$)
1450 Z$=""
1460 T=VAL(T$)
1470 REM COMPARE ANSWER WITH TRUTH
1480 T=VAL(T$)
1490 PRINT CHR$(147)
1500 IF X=Q THEN 1550
1505 REM ITEM 1510 THRU 1570 COMPUTES SCORES AND SENDS THEM
1510 C$=CHR$(120)+T$+"2"+CHR$(121):PRINT#2,C$; :IF T=8 THEN 2790
1520 PRINT#2,CHR$(100);T;S(T,1);CHR$(101)
1530 PRINT#2,"BOO !BOO !";U$(T);CHR$(13):PRINT"BOO !BOO !";U$(T)
1540 GOTO 1630
1550 S(T,1)=S(T,1)+S(T,3)+1
1560 IF T=8 THEN 2650 :FOR D=1 TO 10000:NEXT
1570 PRINT#2,CHR$(100);T;S(T,1);CHR$(101)
1580 REM ITEM 1580 THRU 1700 PRINTS RESULTS
1590 PRINT "GREAT ";U$(T)
1600 PRINT#2,"GREAT ";U$(T);CHR$(13)
1610 C$=CHR$(120)+T$+"1"+CHR$(121)
1620 PRINT#2,C$;
1630 PRINT#2,D;CHR$(Y);E;"=";Q;CHR$(13);
1640 PRINT"NAME            SCORE"
1650 FOR T=1 TO 8
1660 PRINT U$(T);TAB(16); S 1)
1670 NEXT T
```

```
1680 FOR I=1 TO 4:PRINT:NEXT I
1690 Z$="" :T$="" : X$=""
1700 FOR I=1 TO 10 :GETB$:NEXT I
1705 REM ITEM 1710 UPDATES GAME #
1710 N=N+1
1720 GOTO 820
1730 REM HANDICAP ROUTINE
1740 FOR T=1 TO 8
1750 B(T,1)=500
1760 S(T,2)=S(T,1)
1770 NEXT T
1780 FOR J=1 TO 8
1790 FOR T=1 TO 8
1800 IF S(T,2) < B(J,1)THEN B(J,2)=T
1810 IF S(T,2) < B(J,1) THEN B(J,1)=S(T,2)
1820 NEXT T
1830 U=B(J,2)
1840 S(U,2)=500
1850 NEXT J
1860 J=8
1870 H=B(J,1)
1880 FOR T=1 TO 8
1890 X=(H-S(T,1))*.75
1900 S(T,3)=INT(X)
1910 NEXT T
1920 FOR T=1 TO 8
1930 A(T)=A(T)+S(T,3)
1940 NEXT T
1950 FOR T=1 TO 8
1960 IF S(T,1)<=25 THEN 1990
1970 NEXT
1980 RETURN
1990 PRINT#2,U$(T);" IS THE GRAND WINNER"
2000 P=T
2010 GOTO 2080
2020 PRINT U$ (P); " IS THE WINNER"
2030 PRINT"TO PLAY AGAIN HIT SHIFT-F1"
2040 GETB$
2050 IF B$<> CHR$(137) THEN GOTO 2040
2060 PRINT #2,CHR$(137)
2070 GOTO 2260
2080 REM MUSICAL SCALE
2090 RESTORE
2100 FOR L=54272 TO 54296:POKEL,0:NEXT
2110 POKE 54296,15
2120 POKE 54277,9
2130 POKE 54276,17
2140 FOR T=1 TO 300:NEXT
2150 READ A
2160 READ B
2170 IF B=-1 THEN GOTO 2020
2180 POKE 54273,A:POKE 54272,B
2190 POKE 54276,17
2200 FOR T=1 TO 250 :NEXT:POKE54276,16
2210 FOR T=1 TO 50:NEXT
2220 GOTO 2120
2230 DATA17,37,19,63,21,154,22,227
2240 DATA25,177,28,214,32,94,34,175
2250 DATA-1,-1
2260 REM SCORE STORING ROUTINE (ITEM 2260-2440)
2270 G=G+1
2280 OPEN 4,8,4,"@0:GAME#,S,W"
2290 PRINT#4,G
2300 CLOSE4
2310 S$="SCORE"+STR$(G)
2320 K$=CHR$(34)+"@0:"+S$+",S,W"+CHR$(34)
2330 OPEN4,8,4,K$
2340 FOR T=1 TO 8
2350 PRINT#4,U$(T)
2360 U$(T)=""
2370 PRINT#4,S(T,1)
2380 S(T,1)=0
2390 PRINT#4,A(T)
2400 A(T)=0
2410 NEXT T
2420 CLOSE4
2430 GOTO 240
2240 REM SCORE.READ-ITEM 2440 TO 2610
2450 P$="DOGS"
2460 INPUT "ENTER PASSWORD"
2470 IF F$=P$ THEN GOTO 2490
2480 GOTO 290
```

```
2490 PRINT "THE LAST GAME NUMBER WAS ";G
2500 INPUT"ENTER GAME NUMBER";J$
2510 J$="SCORE "+J$
2520 K$=CHR$(34)+"@0:"+J$+",S,R"+CHR$(34)
2530 OPEN4,8,4,K$
2540 PRINT"NAME";TAB(12);"SCORE";TAB(20);"HANDICAP"
2550 FOR T=1 TO 8
2560 INPUT#4,U$
2570 INPUT#4,S
2580 INPUT#4,A
2590 PRINT U$;TAB(12);S;TAB(20);A
2600 NEXT T
2610 CLOSE4
2620 INPUT"WHEN READY TO CONTINUE,HIT RETURN";A
2630 PRINTCHR$(147)
2640 GOTO 290
2650 REM HAPPY RESPONSE
2660 FOR L=54272 TO 54296:POKEL,0:NEXT
2670 FOR V= 1 TO 3
2680 POKE54296,15
2690 POKE54277,190
2700 POKE54278,130
2710 POKE54273,(V+16)
2720 POKE 54272,(36+V)
2730 POKE54276,17
2740 FOR X=1 TO 500 : NEXT X
2750 POKE54276,16
2760 NEXT V
2770 FOR L=54272 TO 54296:POKEL,0 : NEXT
2780 GOTO 1570
2790 REM SAD RESPONSE
2800 FOR L=54272 TO54296:POKEL,0:NEXT
2810 FOR V=1 TO 3
2820 POKE54296,15
2830 POKE54277,68
2840 POKE54278,248
2850 POKE54273,150
2860 POKE54272,(2+20*V)
2870 POKE54276,129
2880 FOR X= 1 TO 500 : NEXT X
2890 POKE54276,16
2900 NEXT V
2910 FOR L=54272 TO 54296:POKEL,0:NEXT
2920 GOTO 1520
 100 REM SLA111.1
 110 OPEN 2,2,2,CHR$(6)+CH 1)
 130 DIM X(500)
 140 PRINT CHR$(147)
 150 U$=""
 160 FOR T= 1 TO 8:S(T)=0:NEXT T
 170 FOR T= 1 TO 20 : GET#2, A$ :NEXT T
 180 GET#2,A$
 190 IFA$<>CHR$(63) THEN 180
 210 PRINT CHR$(147)
 220 PRINT"ENTER YOUR NAME";
 230 T$="3"
 240 GET B$
 250 IF B$<>"" THEN U$=U$+B$:Z=LEN(U$):Z=Z-2:IF B$=CHR$(20) THEN U$=LEFT$(U$,Z)
 260 IF B$<>"" THEN PRINT B$;
 270 IF B$=CHR$(13) THEN GOTO 310
 280 GET#2,A$
 290 IF A$=CHR$(137) THEN 140
 300 GOTO 230
 310 FOR I= 1 TO 20:GET#2,A$:NEXT I
 320 FOR I=1 TO 499
 330 X(I)=PEEK(56577)
 340 IF I < 4 THEN GOTO 380
 350 Y= X(-1)+ X(I)
 360 X=X(I-3)+X(I-2)
 370 IF X-Y <0 THEN GOTO 390
 380 NEXT I
 390 PRINT#2,T$;U$;CHR$(13)
 400 REM ITEM 410 THRU 520 GETS A LIST OF PLAYERS FROM THE MASTER
 410 GET#2,A$
 420 IF A$<>CHR$(32) THEN 410
 430 FOR T=2 TO 10
 440 X$=""
 450 GET#2,A$
 460 IF A$="" THEN GOTO 450
 470 IF A$=CHR$(32) THEN GOTO 450
 480 IF A$<> CHR$(13) THEN X$=X$+A$
 490 IF A$= CHR$(13) THEN U$(T)=X$
```

-continued

```
500  IF A$ <> CHR$(13) THEN GOTO 450
510  IF U$(T)="" THEN U$(T)=CHR$(48)
520  NEXT T
530  FOR T= 1 TO 8
540  U$(T)=U$(T+2)
550  NEXT T
560  PRINT "NAME           SCORE"
570  FOR T=1 TO 8
580  PRINT U$(T);TAB(16);S(T)
590  NEXT T
600  X$=""
610  REM ITEM 620 THRU 910 GETS PROBLEM FROM MASTER AND SENDS ANSWERS TO MASTER
620  GET#2,A$
630  IF A$=CHR$(120)THEN 1090
640  IF A$ <> "" OR A$<>CHR$(13)THENY$=Y$+A$
650  IF A$=CHR$(13) THEN PRINT Y$
660  IF A$=CHR$(13) THEN Y$=""
670  IF A$=CHR$(100) THEN 920
680  IF A$=CHR$(137) THEN 140
690  GET B$
700  IF B$<>""THEN PRINT B$;
710  IF B$ <> "" THEN X$=X$+B$
720  IF B$=CHR$(13) THEN Q$=T$+X$+CHR$(99)
730  IF B$=CHR$(13) THEN X$=""
740  IF B$=CHR$(13) THEN GOTO 760
750  GOTO 620
760  REM SENDS ANSWER WHEN SO INSTRUCTED BY MASTER
770  IF LEN(Q$)>5 THEN Q$=T$+CHR$(99)
790  FOR I=1 TO 65
800  X(I)= PEEK(56577)
810  IF I< 4 THEN GOTO 850
820  Y=X(I-1)+ X(I)
830  X=X(I-3)+X(I-2)
840  IF X-Y<-32 THEN GOTO 870
850  NEXT I
860  GOTO 880
870  PRINT#2,Q$
880  Q$="":X$="":S$=""
890  Y$=""
900  FOR I=1 TO 5:GETB$:NEXT I
910  GOTO 620
920  Q$="":X$="" :S$="":P CHR$(147)
930  FOR W=1TO10:GETB$:NEXT
940  GET#2, A$
950  IF A$="" THEN 940
960  IF A$<> CHR$(101) THEN S$=S$+A$
970  IF A$ <> CHR$(101) THEN GOTO 940
980  F$=LEFT$(S$,2) : T=VAL(F$)
990  IF U$(T)="" THEN U$(T)=CHR$(48)
1000 S$(T)=MID$(S$,3)
1010 S(T)=VAL(S$(T))
1020 PRINT"NAME           SCORE"
1030 FOR T=1 TO 8
1040 PRINTU$(T);TAB(16);S(T)
1050 NEXT T
1060 X$="" : Y$="" :Q$=""
1070 FOR I=1.TO 5:GETB$:NEXT I
1080 GOTO 620
1090 REM GET CONTROL MESSAGE
1100 C$=""
1110 FOR I=1 TO 20
1120 GET#2,A$
1130 IF A$=CHR$(121) THEN 1160
1140 IF A$<>"" THEN C$=C$+A$
1150 NEXT I
1160 REM ANIMATION ROUTINE
1170 V$=LEFT$(C$,1)
1180 C$=MID$(C$,2,1)
1190 C=VAL(C$)
1200 IF C=1 AND V$=T$ THEN 1240
1210 IF C=2 AND V$=T$ THEN 1380
1220 FOR X=1 TO 1000:NEXT
1230 GOTO 620
1240 REM HAPPY RESPONSE
1250 FORL=54272 TO 54296:POKEL,0:NEXT
1260 FOR I=1 TO 3
1270 POKE54296,15
1280 POKE54277,190
1290 POKE54278,130
1300 POKE54273,(I+16)
1310 POKE54272,(36+I)
1320 POKE54276,17
```

-continued

```
1330 FORT=1 TO 500 :NEXT
1340 POKE54276,16
1350 NEXT
1360 FORL=54272TO54296:POKEL,0:NEXT
1370 GOTO 620
1380 REM SAD RESPONSE
1390 FORL=54272 TO 54296:POKEL,0:NEXT
1400 FOR I= 1 TO 3
1410 POKE54296,15
1420 POKE54277,68
1430 POKE54278,248
1440 POKE54273,150
1450 POKE54272,(2+20*I)
1460 POKE54276,129
1470 FORT=1 TO 500 :NEXT
1480 POKE54276,16
1490 NEXT
1500 FOR L=54272TO54296: POKEL,0:NEXT
1510 GOTO 620
```

I claim:

1. A competitive computer educational game for teaching a plurality of students in the classroom enviornment, utilizing a computer network where all students are simultaneously asked a question, each student having access to an input device with which to enter an answer, with a master computer asking the questions and keeping score, and comprising: a means of providing a continuously updated handicap to the faster students in order to encourage the slower students to maintain an interest in the learning process.

2. A competitive computer educational game for teaching a plurality of students in the classroom enviornment, utilizing a computer network where all students are simultaneously asked a question, each student having access to an input device with which to enter an answer, with a master computer asking the questions and keeping score, and comprising: a means of computing an instantaneous handicap for each student based on a predetermined function of the difference between his score and the player with the highest score, a means of adding such handicap points to the slower students score when they enter a correct answer in such a manner that all the students scores tend to be equalized, thereby encouraging the slower students to maintain an interest in the learning process.

3. A competitive computer educational game for teaching a plurality of students in the classroom enviornment, utilizing a computer network where all students are simultaneously asked a question, each student having access to and input device with which to enter an answer, with a master computer asking the questions and keeping score, and comprising: a means of adjusting the time allowed for each student to answer in the inverse order of their instantaneous score, thereby giving the students with a low score more time to answer, thereby encouraging the slower students to mainttain their interest in the learning process.

4. A competitive computer educational game as set forth in claim 3 further comprising a means of computing an instantaneous handicap for each student based on a predetermined function of the difference between his score and the player with the highest score, and a means of adding said handicap to the slower students score when they enter a correct answer in such a manner that all student scores tend to be equalized.

5. The competitive computer educational game recited in claim 2, 3, or 4 further incorporating: a voice synthesizer to verbally ask the questions.

6. The competitive computer educational game as set forth in claim 5 further incorporating a means for recording each students score and handicap for further evaluation by the teacher.

7. The competitive computer educational game as set forth in claim 5 further incorporating a means for providing sound effects to praise or boo the first student to enter an answer depending upon the correctness of his or her answer.

8. The competitive computer educational game recited in claim 2, 3, or 4 further incorporating: a means for recording each students score and handicap for further evaluation by the teacher.

9. The competitive computer educational game as set forth in claim 8 further incorporating a means providing sound effects to praise or boo the first student to enter an answer depending upon the correctness of his or her answer.

10. The competitive computer educational game recited in claim 2, 3, or 4 further incorporating: a means for providing sound effects to praise or boo the first student to enter an answer depending upon the correctness of his or her answer.

* * * * *